US008524404B2

(12) United States Patent
Logan

(10) Patent No.: US 8,524,404 B2
(45) Date of Patent: Sep. 3, 2013

(54) FUEL CELL ANODE STOICHIOMETRY CONTROL

(75) Inventor: Victor W. Logan, Naples, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2168 days.

(21) Appl. No.: 11/457,880

(22) Filed: Jul. 17, 2006

(65) Prior Publication Data

US 2008/0014472 A1 Jan. 17, 2008

(51) Int. Cl.
*H01M 8/04* (2006.01)
(52) U.S. Cl.
USPC ........................................... 429/428; 429/452
(58) Field of Classification Search
USPC ............................................................ 429/13
See application file for complete search history.

(56) References Cited

U.S. PATENT DOCUMENTS

| | | | |
|---|---|---|---|
| 6,569,549 B1 | 5/2003 | Sawyer | |
| 7,862,937 B2 | 1/2011 | Iio | |
| 2005/0181249 A1 | 8/2005 | Logan | |
| 2006/0003204 A1* | 1/2006 | Callahan et al. | 429/22 |
| 2006/0068243 A1 | 3/2006 | Lienkamp | |
| 2007/0009772 A1* | 1/2007 | Iio | 429/13 |
| 2007/0243437 A1 | 10/2007 | Katano | |

FOREIGN PATENT DOCUMENTS

| | | |
|---|---|---|
| JP | 9204226 A | 8/1997 |
| WO | WO 2004/105169 | * 12/2004 |

OTHER PUBLICATIONS

Flow Equations For Sizing Control Valves, ISBN 0-87664-899-5, ISA-S75.01-1985.*
"Development of electro-pneumatic fast switching valve and investigation of its characteristics", Elif Erzan Topçu, Ibrahim Yüksel, and Zeliha Kamış , Mechatronics vol. 16, Issue 6, Jul. 2006, pp. 365-378, available online Apr. 17, 2006, pp. 368-369.*

* cited by examiner

*Primary Examiner* — Ula C Ruddock
*Assistant Examiner* — Jacob Marks
(74) *Attorney, Agent, or Firm* — John A. Miller; Miller IP Group, PLC

(57) ABSTRACT

A system and method for controlling an anode exhaust gas bleed valve in a fuel cell system that includes estimating the gas composition in the anode exhaust gas, using an inverse valve model to calculate a desired valve flow coefficient, and bleeding the anode exhaust gas at a flow rate that results in the desired valve flow coefficient. The method includes determining the partial pressure of nitrogen in the anode exhaust gas, calculating the partial pressure of water vapor and hydrogen in the anode exhaust gas, and calculating the gas mole fraction of the nitrogen, water vapor and hydrogen in the anode exhaust gas. The method also includes using the gas mole fraction of nitrogen, water vapor and hydrogen to determine the desired valve flow coefficient, and using the desired valve flow coefficient to determine when to open and close the bleed valve.

9 Claims, 3 Drawing Sheets

FUEL CELL ANODE STOICHIOMETRY CONTROL

BACKGROUND OF THE INVENTION

1. Field of the Invention

This invention relates generally to a system and method for determining when to perform an anode exhaust bleed for an anode recirculation loop of a fuel cell system and, more particularly, to a system and method for determining when to perform an anode exhaust bleed for an anode recirculation loop of a fuel cell system, where the method includes using a model to estimate the gas composition in the anode exhaust gas and an inverse valve model to calculate a desired valve flow coefficient to bleed the anode exhaust gas at a flow rate that results in a desired anode stoichiometry.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of flow field or bipolar plates positioned between the several MEAs in the stack. The bipolar plates include an anode side and a cathode side for adjacent fuel cells in the stack. Anode reactant gas flow channels are provided on the anode side of the bipolar plates that allow the anode gas to flow to the anode side of the MEA. Cathode reactant gas flow channels are provided on the cathode side of the bipolar plates that allow the cathode gas to flow to the cathode side of the MEA. The bipolar plates also include flow channels through which a cooling fluid flows.

It is desirable that the distribution of hydrogen within the anode flow channels in the fuel cell stack be substantially constant for proper fuel cell stack operation. Therefore, it is known in the art to input more hydrogen into the fuel cell stack than is necessary for a certain output load of the stack so that the anode gas distribution is accessible. However, because of this requirement, the amount of hydrogen in the anode exhaust gas is significant, and would lead to low system efficiency if that hydrogen was discarded. Therefore, it is known in the art to recirculate the anode exhaust gas back to the anode input to reuse the discarded hydrogen.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, such as 80%, the fuel cell stack becomes unstable and may fail. It is known in the art to provide a bleed valve at the anode output of the fuel cell stack to remove nitrogen from the anode side of the stack. The bled hydrogen can be sent to any suitable location, such as a combustor or the environment.

In order to operate the fuel cell stack under optimized conditions and to maximize system performance, a large enough amount of hydrogen in the anode recirculation gas and a certain recirculation rate need to be achieved. However, there are currently no hydrogen concentration sensors or flow rate sensors suitable for a fuel cell system. Therefore, a direct controllability of the operation parameter recycle flow and anode hydrogen concentration is not possible.

SUMMARY OF THE INVENTION

In accordance with the teachings of the present invention, a system and method are disclosed for controlling an anode exhaust gas bleed valve of a fuel cell system that includes estimating the gas composition in the anode exhaust gas, using an inverse valve model to calculate a desired valve flow coefficient, and bleeding the anode exhaust gas at a flow rate that results in the desired valve flow coefficient. The method includes determining the partial pressure of nitrogen in the anode exhaust gas, and using the partial pressure of nitrogen to calculate a flow rate of nitrogen in the anode exhaust. The method also includes calculating the partial pressures of water vapor and hydrogen in the anode exhaust gas, and using the partial pressure of the nitrogen, the water vapor and the hydrogen to calculate the gas mole fraction of the nitrogen, water vapor and hydrogen in the recirculation gas. The method also includes using the gas mole fraction of nitrogen, water vapor and hydrogen in the anode exhaust gas to determine the desired valve flow coefficient, and using the desired valve flow coefficient to determine when to open and close the bleed valve.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for controlling an anode bleed valve in a fuel system is merely exemplary in nature, and is in no way intended to limit the invention or its applications or uses. For example, the method of the invention for controlling the bleed valve discussed below has application for a fuel cell system that employs anode recirculation. However, as will be appreciated by those skilled in the art, the method for controlling the bleed valve will have applications for other fuel cell systems, such as anode flow shifting systems.

Figure 1:
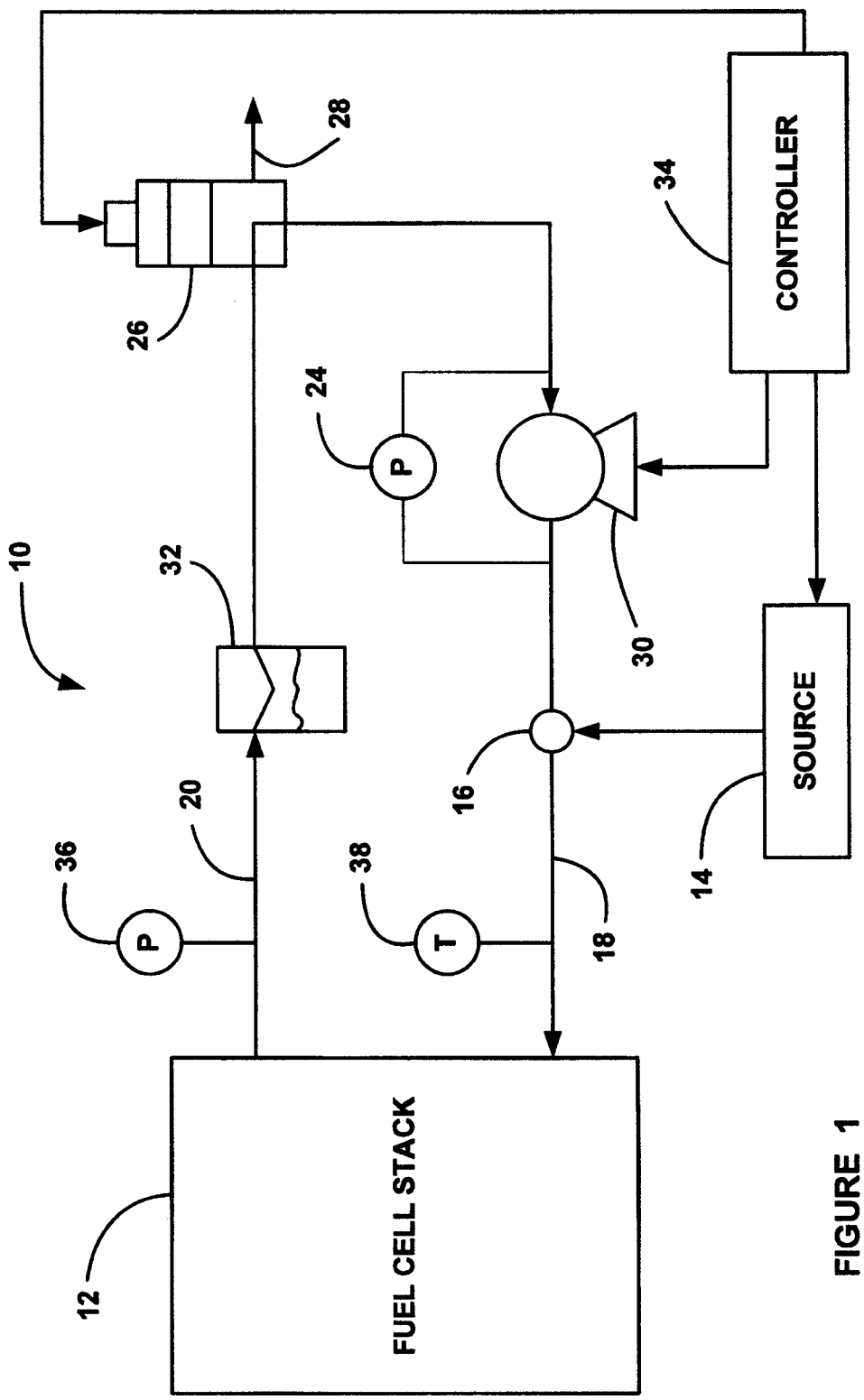
FIG. 1 is a schematic diagram of an anode recirculation loop in a fuel cell system that employs a control technique for controlling a bleed valve, according to an embodiment of the present invention.

FIG. 1 is a schematic diagram of a fuel cell system 10 including a fuel cell stack 12. Hydrogen gas from a hydrogen source 14 is provided to a mixing junction 16 and then sent to the anode side of the fuel cell stack 12 on line 18. An anode exhaust gas is output from the fuel cell stack 12 on line 20 and is sent to a bleed valve 26. A recirculation pump 30 pumps the anode exhaust gas through the valve 26 to the mixing junction 16 to be mixed with the fresh hydrogen from the source 14 to provide an anode recirculation loop. The pressure within the recirculation loop needs to be controlled so that it is about equal to the pressure on the cathode side of the stack 12. The proper mixture of the fresh hydrogen from the source 12 and the recirculated anode exhaust gas at the mixing junction 16 sets the pressure of the anode side of the stack 12. The ratio of fresh fuel to recirculated fuel is dependent on many factors, such as operating conditions, recirculation pump volumetric flow rate, etc.

As discussed above, nitrogen cross-over from the cathode side of the fuel cell stack 12 dilutes the hydrogen in the anode side that affects stack performance. Therefore, it is necessary to periodically bleed the anode exhaust gas to reduce the amount of nitrogen being recirculated. During the nitrogen bleed, the valve 26 is controlled to divert a portion of the anode exhaust gas from the recirculation loop to an exhaust line 28. It is beneficial to adapt the recirculation rate of the anode gas to the fuel cell load and the hydrogen feed gas flow to support proper water management and to reduce parasitic loads on the fuel cell system.

In order to monitor the anode gas recirculation, various sensors are provided in the system 10. Particularly, a pressure sensor 36 measures the pressure in the anode recirculation loop in the line 20 and a pressure sensor 24 measures the pressure across the recirculation pump 30. Further, a temperature sensor 38 measures the temperature of the recirculation gas in the recirculation loop in the line 18. Also, a water trap 32 removes by-product water from the anode exhaust gas. The water vapor that is present in the anode exhaust gas that is recirculated back to the input line 18 helps with the necessary membrane humidification, especially at the inlet side of the stack 12. A controller 34 controls the amount of fresh hydrogen from the source 14, the speed of the pump 30 and the position of the bleed valve 26 based on the discussion below. The controller 34 also receives measurement signals from the pressure sensors 36 and 24 and the temperature sensor 38.

Based on the discussion above, it is desirable for the controller 34 to know when to provide an anode exhaust gas bleed to the exhaust line 28. In some systems, if the concentration of hydrogen in the recirculation loop falls below a predetermined percentage, such as 50%, then the controller 34 will open the bleed valve 26 for some predetermined period of time to reduce the amount of nitrogen.

As will be discussed in detail below, the controller 34 uses a model to estimate the gas composition of the anode exhaust gas in line 20, and an inverse valve model to calculate a desired valve flow coefficient $C_v$ needed to bleed the anode recirculation gas at a flow rate that achieves a desired anode stoichiometry. The controller 34 then controls the bleed valve 26 to obtain the desired valve flow coefficient $C_v$. Although the model discussed below has particular application for bleeding the recirculation gas from the bleed valve 26, the model also has applications for other fuel cell system designs that may not employ anode recirculation.

The nitrogen cross-over is a function of the nitrogen partial pressure across the membrane in the fuel cell and the permeability of the membrane as:

$$V_{N2} = \frac{P_{N_2} A \Delta p_{N_2}}{t} \quad (1)$$

Where $V_{N2}$ is the volume flow of the anode recirculation gas, $P_{N_2}$ is a permeability coefficient in barrers, A is the area of the membrane in cm$^2$, $\Delta P_{N_2}$ is the partial pressure differential of the nitrogen across the membrane in cmHg, and t is the thickness of the membrane in cm. In this calculation, certain assumptions are made, particularly, that the cathode inlet gas includes 79% nitrogen, the anode exhaust gas is 100% humidified.

Figure 2:
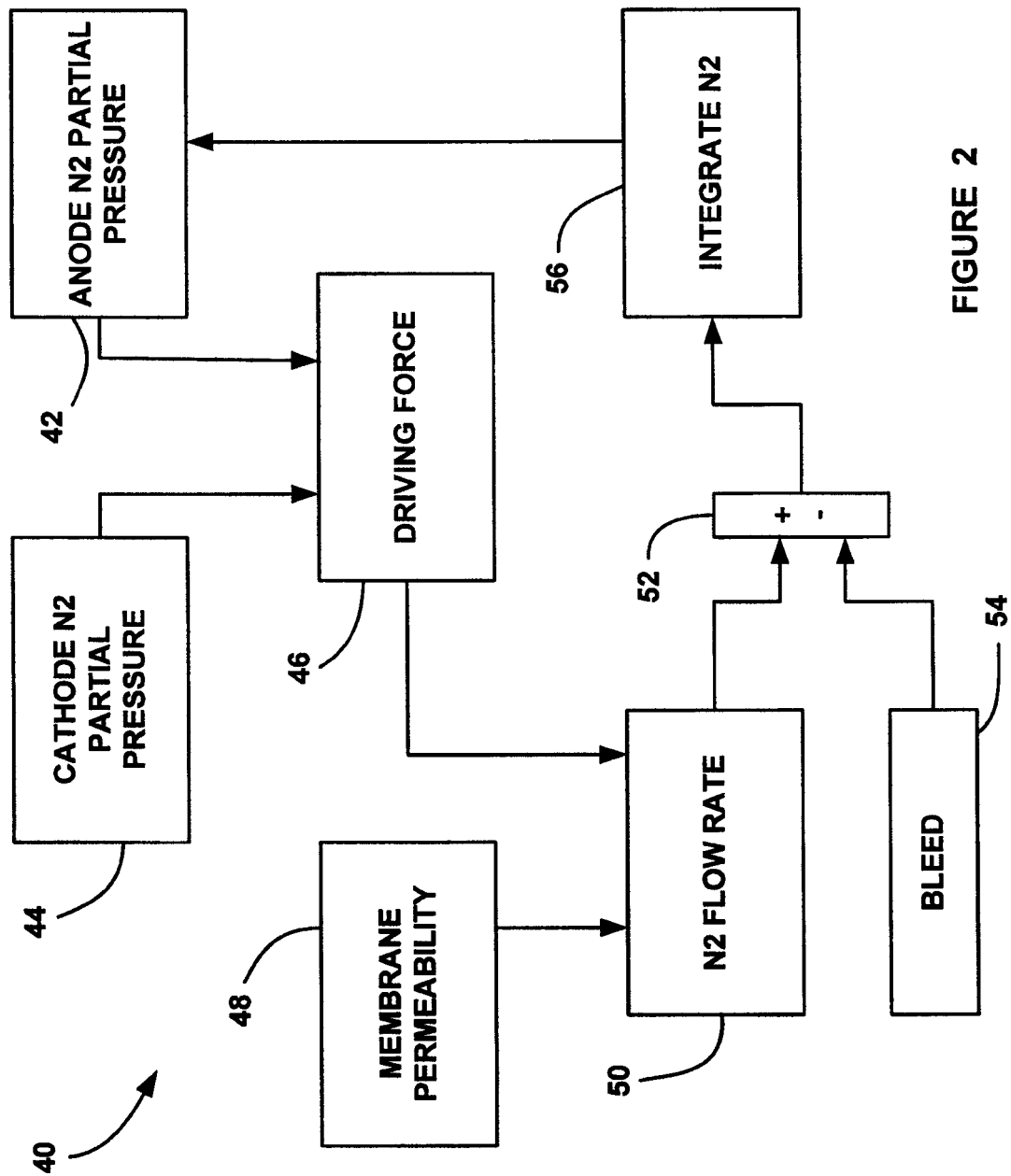
FIG. 2 is a flow chart diagram showing the control strategy for estimating anode exhaust gas composition.

An algorithm that models equation (1) can then be used to calculate the volumetric flow rate of nitrogen into the recirculation gas. FIG. 2 is a flow chart diagram 40 for such an algorithm. The algorithm sets an arbitrary, but reasonable, anode nitrogen partial pressure initial condition (usually zero) at box 42 based on the pressure across the anode inlet and outlet, the temperature of the recirculation gas and the volume of the recirculation gas. The algorithm also knows the averaged cathode nitrogen partial pressure at box 44 as a function of the pressure across the cathode inlet and outlet and the temperature. The cathode nitrogen partial pressure and the anode nitrogen partial pressure are subtracted at box 46 to determine a driving force $\Delta P_{N_2}$ of the difference in partial pressure of the nitrogen between the cathode and anode. A membrane permeability factor $P_{N2}$ is determined at box 48 as a function of the temperature and other factors specific to the membrane materials. The membrane permeability factor $P_{N2}$ and the driving force $\Delta P_{N2}$ are then used to determine the nitrogen volumetric flow rate through the anode recirculation loop at box 50 based on the area A of the membrane and the thickness t of the membrane. When the controller 34 commands a bleed, the flow rate of nitrogen from the anode recirculation gas to the exhaust is reduced from the flow rate calculated at box 50 by a subtractor 52. The nitrogen content in the anode recirculation loop is then integrated at box 56 that gives the mole fraction of nitrogen in the anode and an updated calculation of the nitrogen partial pressure for the box 42.

The nitrogen partial pressure model uses the nitrogen cross-over rate to estimate the nitrogen partial pressure $P_{N_2}$ at the anode outlet of the stack 12. Based on the temperature, the partial pressure of the water vapor in the recirculation gas can be calculated. The remaining partial pressure is assumed to be the hydrogen fuel partial pressure. These partial pressures can then be used to calculate the mole fractions for the three gases. The gas mole fractions and an inverse valve model are used to calculate the desired valve flow coefficient $C_v$ to bleed the anode recirculation gas at a flow rate that results in a desired anode stoichiometry.

The flow of a compressible fluid can be derived from Darcy's equation as:

$$Q = 1360 F_p C_v P_1 Y \sqrt{\frac{x}{S_g T_1 Z}} \quad (2)$$

Where Q is flow in standard cubic feet per hour (SCFH), $C_v$ is the valve flow coefficient in gallons of water per minute at 1 psid at 60° F., $P_1$ is an upstream pressure in pounds per square inch absolute, Y is the expansion factor, x is the pressure drop ratio, $S_g$ is the specific gravity of the gas through the valve 26, $T_1$ is the temperature of the gas in °R, $F_p$ is the piping factor and Z is the compressibility factor. When the valve inlet and outlet piping is sized properly, the piping factor $F_p$ is approximately equal to 1. Also, for the gases and pressures in this application, the compressibility factor is about 1.

The specific gravity $S_g$ is the ratio of the molecular weight MW of the gas over the molecular weight MW of air as:

$$S_g = \frac{MW_{gas}}{MW_{air}} \tag{3}$$

The molecular weight MW of the recirculation gas is the sum of the gas mole fraction of the gases times their molecular weights as:

$$MW_{gas} = mf_{H_2} 2.016 + mf_{H_2O} 18.015 + mf_{N_2} 28.013 + mf_{O_2} 31.999 \tag{4}$$

Which yields:

$$S_g = \frac{mf_{H_2} 2.016 + mf_{H_2O} 18.015 + mf_{N_2} 28.013 + mf_{O_2} 31.999}{0.0126 * 18.015 + 0.7815 * 28.013 + 0.2059 * 31.999} \tag{5}$$

Where mf is the mole fraction, and where:

$$mf_{H_2} + mf_{H_2O} + mf_{N_2} + mf_{O_2} = 1 \tag{6}$$

The expansion factor Y is given as:

$$Y = 1 - \frac{x}{3F_k x_t} \tag{7}$$

Where:

$$F_k = \frac{K}{1.4} \tag{8}$$

And where x is the pressure drop ratio, $x_t$ is the terminal pressure drop ratio, $F_k$ is the ratio of specific heat factor, K is the ratio of specific heats. For the gases and pressures in this application, the ratio of specific heats is about 1.39, therefore, $F_k$ is approximately 1.

The pressure drop ratio x is given as:

$$x = \frac{P_1 - P_2}{P_1} \tag{9}$$

Where $P_2$ is the downstream pressure in pounds per square inch absolute. The value $x_t$ is the terminal pressure drop ratio, and is specific to a valve's geometry and may be determined experimentally.

When $x < F_k * x_t$, the flow is sub-critical, and when $x > F_k * x_t$, the flow is critical. In the latter case, $F_k * x_t$ is used in the place of x. From the discussion above, the flow Q for sub-critical flow and critical flow can be simplified as:

$$Q = 1360 C_v P_1 Y \sqrt{\frac{x}{S_g T}} \tag{10}$$

$$Q = 1360 C_v P_1 \frac{2}{3} \sqrt{\frac{x_t}{S_g T}} \tag{11}$$

Rearranging the above equations and solving for the valve flow coefficient $C_v$ for both the sub-critical flow and the critical flow yields:

$$C_v = \frac{Q \sqrt{S_g T}}{1360 P_1 Y \sqrt{x}} \tag{12}$$

$$C_v = \frac{Q \sqrt{S_g T}}{1360 P_1 \frac{2}{3} \sqrt{x_t}} \tag{13}$$

It is known that:

$$\dot{n}_{H_2\_consumed} = \frac{I \# Cells}{2Fa} \tag{14}$$

$$H_{2\_bleed} = H_{2\_consumed}(stoich - 1) \tag{15}$$

Where $\dot{n}$ is the flow rate of the hydrogen consumed by the stack 12 in moles per second, I is current in amps, Fa is the Faraday number in coulombs per mole, $H_{2\_bleed}$ is the amount of hydrogen bled through the bleed valve 26, and $H_{2\_consumed}$ is the amount of hydrogen consumed by the stack 12.

From the anode model discussed above, the gas mole fractions are known. Therefore, the anode exhaust flow rate $\dot{n}$ can be solved as:

$$\dot{n}_{H_2} = \dot{n}_{total} mf_{H_2} \tag{15}$$

$$\dot{n}_{total} = \frac{\dot{n}_{H_2}}{mf_{H_2}} \tag{16}$$

The anode exhaust flow rate values can then be inserted into equations (11) and (12), where Q=$\dot{n}$ (after the proper units conversion), to get the desired valve flow coefficient $C_v$ for both sub-critical flow and critical flow. It is determined if the flow is sub-critical or critical, and then the appropriate equation is used for one $C_v$ value.

The controller 34 then controls the bleed valve 26 to achieve the desired valve flow coefficient $C_v$. The bleed valve 26 may be a variable orifice pintel type valve. In one embodiment, the bleed valve 26 is a solenoid valve having a known full valve flow coefficient $C_{v\text{-}valve}$. The valve 26 may be pulse width modulated to obtain an effective $C_v$. The duty cycle of the valve 26 would be set to the ratio of the desired valve flow coefficient $C_v$ to the full valve flow coefficient $C_{v\text{-}valve}$ as:

$$duty\_cycle = \frac{C_v}{C_{v\_valve}} \tag{18}$$

Figure 3:
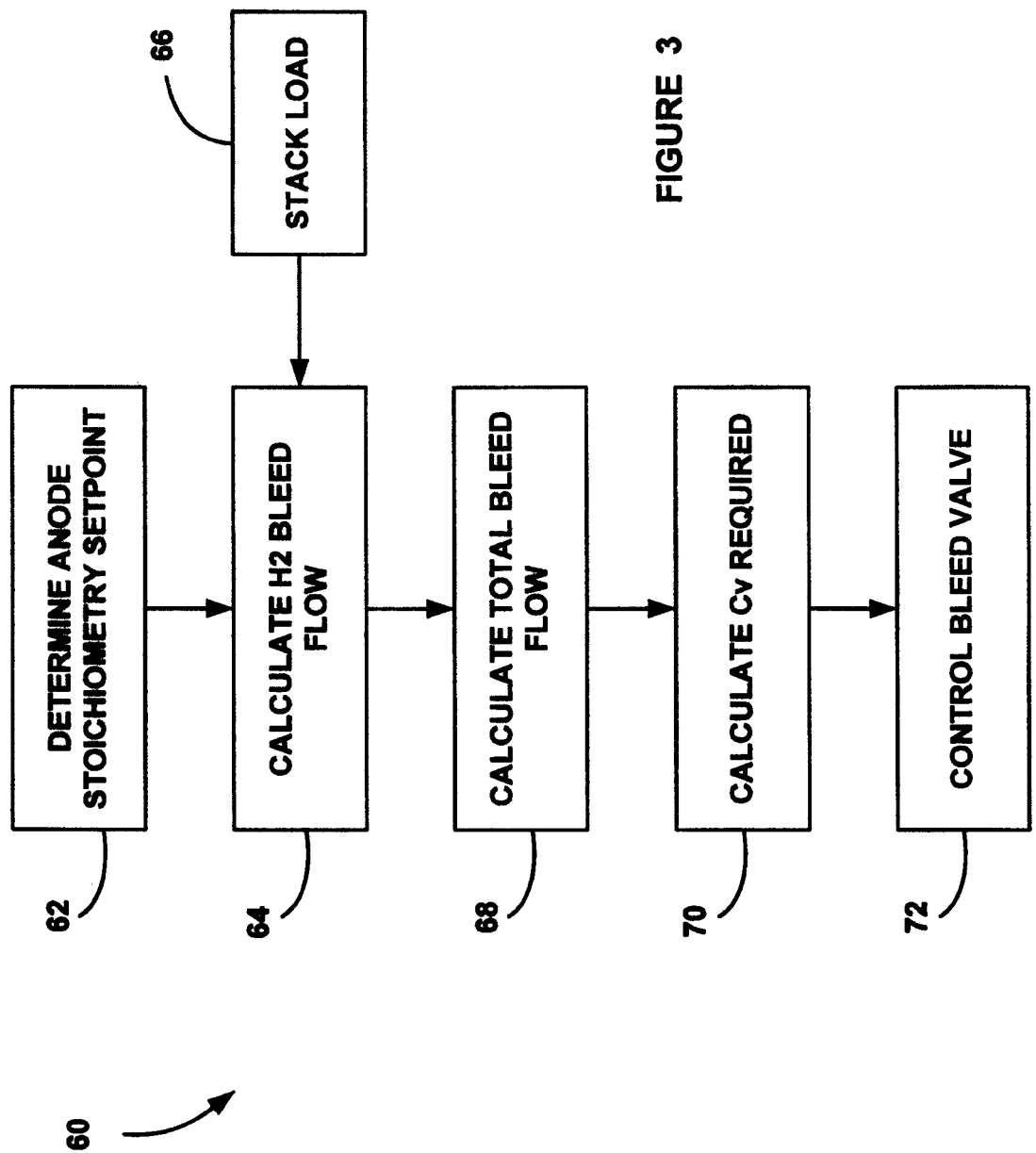
FIG. 3 is a flow chart diagram showing the control strategy for controlling the bleed valve.

FIG. 3 is a flow chart diagram 60 showing the control strategy for controlling the bleed valve 26 based on the discussion above. The control algorithm first determines the anode stoichiometry setpoint at box 62. The algorithm then calculates the hydrogen bleed flow at box 64 based on the stack load at box 66. The algorithm then calculates the total bleed flow at box 68 using the integrated nitrogen content in the anode recirculation loop from box 56. The algorithm then calculates the valve flow co-efficient $C_v$ at box 70 to control the bleed valve 26 at box 72.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including an anode input and an anode output;
a bleed valve for periodically bleeding anode exhaust gas from the anode output; and
a controller for controlling the bleed valve, said controller determining the partial pressure of nitrogen in the anode exhaust gas, calculating the partial pressure of water vapor and hydrogen in the anode exhaust gas, calculating the gas mole fraction of the nitrogen, the water vapor and the hydrogen in the anode exhaust gas using the partial pressure of the nitrogen, the water vapor and the hydrogen, determining a desired valve coefficient using the gas mole fraction of the nitrogen, the water vapor and the hydrogen in the anode exhaust gas, and determining when to open and close the bleed valve using the desired valve flow coefficient.

2. The system according to claim 1 wherein the controller determines the desired valve flow coefficient using the gas mole fractions and an inverse valve model.

3. The system according to claim 2 wherein the controller uses one inverse model for sub-critical flow and one inverse valve model for critical flow.

4. The system according to claim 3 wherein the equation:

$$Q = 1360 C_v P_1 Y \sqrt{\frac{x}{S_g T}}$$

is used for the sub-critical flow, and the equation:

$$Q = 1360 C_v P_1 \frac{2}{3} \sqrt{\frac{x_t}{S_g T}}$$

is used for the critical flow, where Q is flow and standard cubic feet per hour, $C_v$ is the valve flow coefficient, $P_1$ is an upstream pressure, Y is the expansion factor, x is the pressure drop ratio, $x_t$ is the terminal pressure drop ratio, $S_g$ is the specific gravity of the gas through the bleed valve and T is the temperature of a gas.

5. The system according to claim 1 wherein the controller further calculates a flow rate of nitrogen into the anode exhaust gas, and integrating the flow rate of the nitrogen to update the partial pressure of the nitrogen.

6. The system according to claim 5 wherein the controller determines the nitrogen flow rate in the anode exhaust gas using the equation:

$$V_{N2} = \frac{P_{N_2} A \Delta p_{N_2}}{t}$$

where $V_{N2}$ is the volume flow of nitrogen in the anode exhaust gas, $P_{N2}$ is a permeation coefficient, A is the area of a membrane, $\Delta p_{N2}$ is the partial pressure differential of nitrogen permeation across the membrane and t is the thickness of the membrane.

7. The system according to claim 1 wherein the controller assumes that the recirculation gas has a 100% relative humidity to determine the partial pressure of the water vapor, and determines the partial pressure of the hydrogen using the partial pressure of the nitrogen and the water vapor, wherein the combination of the partial pressure of the nitrogen, the water vapor and the hydrogen is the total static pressure in the anode exhaust gas.

8. The system according to claim 1 wherein the bleed valve is a pulse width modulated solenoid valve having a known full valve flow coefficient, and wherein the controller sets the duty cycle of the solenoid valve as the ratio of the desired valve flow coefficient to the full valve flow coefficient.

9. The system according to claim 1 wherein the fuel cell system is on a vehicle.

* * * * *